United States Patent
Ono

(10) Patent No.: US 6,226,877 B1
(45) Date of Patent: May 8, 2001

(54) SEALING STRUCTURE FOR USE IN AN ELECTRIC POWER TOOL

(75) Inventor: Masahiko Ono, Okazaki (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 09/310,276

(22) Filed: May 12, 1999

(30) Foreign Application Priority Data

May 13, 1998 (JP) .................................................. 10-130476

(51) Int. Cl.$^7$ .................................................. B23D 49/16
(52) U.S. Cl. .................................................. 30/392; 30/393
(58) Field of Search ........................ 30/392–394; 92/164, 92/168; 83/169

(56) References Cited

U.S. PATENT DOCUMENTS

| | | | |
|---|---|---|---|
| 2,116,123 | * 5/1938 | Ocenasek | 83/169 X |
| 2,631,619 | 3/1953 | Folli | 143/68 |
| 2,722,244 | 11/1955 | Schultz | 143/156 |
| 3,033,252 | 5/1962 | Atkinson | 143/157 |
| 4,962,588 | 10/1990 | Fushiya et al. | 30/372 |
| 5,392,519 | 2/1995 | Inoue et al. | 30/393 |

\* cited by examiner

*Primary Examiner*—Douglas D. Watts
(74) *Attorney, Agent, or Firm*—Foley, Hoag & Eliot LLP

(57) ABSTRACT

A reciprocating saw includes a structure for sealing a chamber (2a) which is defined by a gear housing (3) and a gear housing cover (4) fitted over the gear housing. The sealing structure includes a rubber packing (18) mounted along the entire length of the seam between the gear housing (3) and the gear housing cover (4). The rubber packing (18) is integrally formed with a V-shaped valve (19) such that a protrusion (20) at the bottom bend of the valve selectively opens and closes an air vent (21) formed in a partition wall (3a) of the gear housing (3). The sealing structure further includes a seal retainer (22) and a dust seal (24) provided between the gear housing (3) and the gear housing cover (4) and penetrated by a reciprocating slider (12). The seal retainer (22) and the dust seal (24) lubricate the slider and seal the chamber (2a) where the slider 12 penetrates the chamber.

12 Claims, 3 Drawing Sheets

SEALING STRUCTURE FOR USE IN AN ELECTRIC POWER TOOL

This application claims priority on Japanese Patent Application No. 10-130476, the contents of which are incorporated herein by reference.

BACKGROUND OF THE INVENTION

1. Field of the Invention

The present invention relates to sealing structures for preventing entry of dust, water, and other foreign matter into electric power tools. More particularly, the present invention relates to a sealing structure for blocking ingress of foreign matter into a body housing of a reciprocating saw and other electric power tools having a reciprocating slidable member which protrudes from the body housing of the tool.

2. Description of the Related Art

Conventionally, electric power tools, such as reciprocating saws, having a reciprocating slider which penetrates a body housing employ a dust seal or packing where the slider penetrates the housing in order to seal the interior of the body housing. Complete sealing, however, has been difficult to achieve due to the reciprocating motion of the slider. Dust tends to enter the body housing particularly easily when the slider is retracted into the body housing. If a reciprocating saw is used to cut a water pipe or is operated under wet conditions, water may enter the body housing of the tool. Such ingress of dust or water may cause damage to or wear of the internal gearing, or hinder the function of the internal bearings of the reciprocating saw, thereby affecting the overall operation of the tool.

SUMMARY OF THE INVENTION

In view of the above-identified problems, an important object of the present invention is to provide a sealing structure for use in an electric power tool for effectively preventing entry of dust and water into a body housing of the tool, thus ensuring greater durability for the tool.

The above objects and other related objects are realized by the invention, which provides a sealing structure for use in an electric power tool which comprises a sealed chamber containing a portion of a reciprocable slide member having a front end which penetrates the chamber and a rear end disposed within the chamber. The sealed chamber, including the area penetrated by the slide member, is sealed off from the outside. The sealing structure further comprises an air vent formed in the sealed chamber for placing the sealed chamber in communication with the atmosphere and a valve provided in the sealed chamber and movable between a first position and a second position. When in the first position, the valve opens the air vent due to an advance of the slide member and when in the second position, the valve closes the air vent due to retraction of the slide member.

According to one aspect of the present invention, the sealed chamber is located downwind of a fan for cooling a motor provided in the electric power tool. Furthermore, the sealed chamber includes a partition wall in close proximity to the fan and the air vent is formed in the area of the partition wall opposing the fan.

According to another aspect of the present invention, the sealed chamber is defined by a pair of casing halves fitted together to form a seam and the sealing structure further comprises an endless seam packing fitted along the entire length of the seam between the casing halves.

According to still another aspect of the present invention, the valve is made of a resilient material formed integrally with the packing and is adapted to move between the first and the second positions in response to the change in the air pressure inside the sealed chamber caused by the reciprocating motion of the slide member.

According to yet another aspect of the present invention, the valve in one embodiment is of the flap or flapper type and is formed in an approximate V-shape having a bottom portion. Furthermore, the flap of the valve is suspended from the seam packing in close proximity to the partition wall inside the sealed chamber and includes a protrusion at the bottom portion for abutting and closing the air vent due to the retraction of the slide member and for moving forward to open the air vent due to the advance of the slide member.

In accordance with another aspect of the present invention, the sealing structure further includes means for positioning the protrusion of the valve with respect to the air vent. This feature allows accurate positioning of the protrusion, for example, during assembly of the electric power tool.

In accordance with still another aspect of the present invention, the sealing structure further includes at least one air passage for bringing a portion of the airflow generated by the fan into the proximity of the area of the sealed chamber penetrated by the slide member via the exterior of the sealed chamber so as to discharge the portion of the airflow substantially parallel to the direction of the advance of the slide member.

In one practice, the sealed chamber includes a casing upper half and a casing lower half which includes the partition wall, and moreover, two of the air passages are symmetrically grooved along the exterior of the casing lower half, each connected at a rear end to a through-hole formed in the partition wall of the sealed chamber.

In another practice, the electric power tool is a reciprocating saw in which a blade is attached to the front end of the slide member.

The present invention is also directed to a reciprocating saw which includes a chamber capable of being selectively sealed off from the outside thereof and a slide member which is disposed in the sealed chamber and has a front end penetrating the sealed chamber to the outside thereof. This slide member is adapted to reciprocate in lengthwise directions between an advance position and an retracted position. The reciprocating saw further includes valve means for placing the inside of the chamber in communication with the outside thereof due to the advance of the slide member and for sealing the chamber due to the retraction of the slide member.

According to one embodiment, the reciprocating saw further includes seal means mounted in the chamber where the chamber is penetrated by the slide member for sealing the chamber where the chamber is penetrated by the slide member. The seal means is also adapted to allow an amount of air substantially corresponding to the volume displaced by the retraction of the slide member within the chamber to be discharged forward out of the chamber at the seal means.

According to another embodiment, the chamber includes at a rear end thereof a wall in which the valve means is mounted and the reciprocating saw further includes a fan provided outside the chamber and directly rearward of and in close proximity to the valve means for delivering air into the chamber through the valve means due to the advance of the slide member.

Other general and more specific objects of the invention will in part be obvious and will in part be evident from the drawings and descriptions which follow.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE PREFERRED EMBODIMENT

A preferred embodiment according to the present invention will be described hereinafter with reference to the attached drawings.

Figure 1:
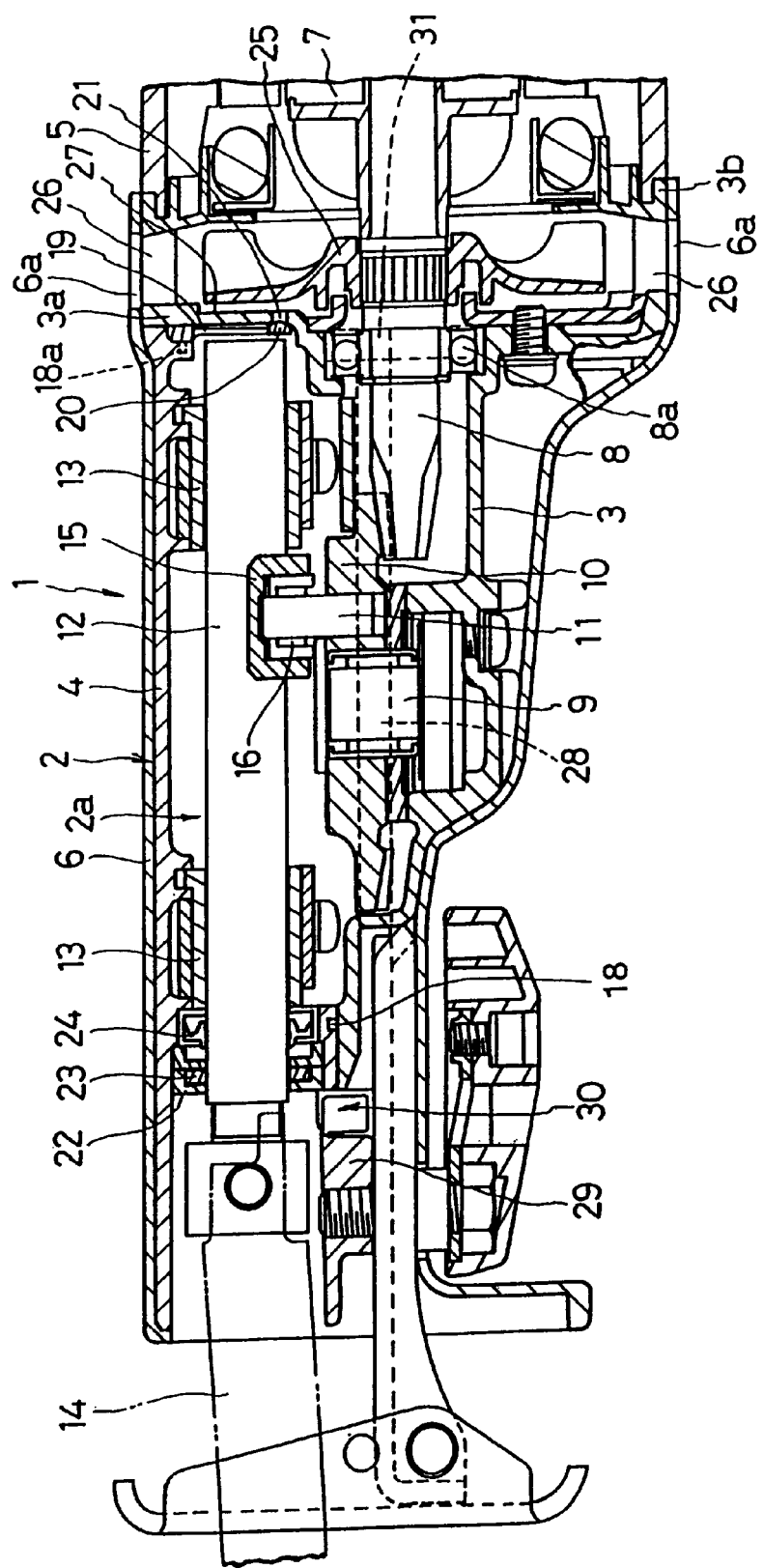
FIG. 1 is a lengthwise cross section of an essential part of a reciprocating saw according to the present invention with the slider in a rearward (retracted) position.

FIG. 1 is a lengthwise cross section of an essential part of a reciprocating saw 1 according to the present invention. Reciprocating saws of this type are known, as shown for example in U.S. Pat. Nos. 2,631,619; 2,722,244; 3,033,252; 4,962,588; and 5,392,519. FIGS. 1 and 3 show views corresponding to the view in FIG. 1 of the aforementioned U.S. Pat. No. 5,392,519 and corresponding to the view in FIG. 2 of the aforementioned U.S. Pat. No. 4,962,588. The latter two patent publications are incorporated herein by this reference.

The reciprocating saw 1 of FIG. 1 includes a body housing 2 and a motor housing 5 coupled to the rear (to the right as seen in FIG. 1) of the body housing 2. The housing 2 includes a gear housing 3 and gear housing cover 4 and is encased in an insulating cover 6 made of polyuretane rubber.

A motor 7 disposed in the motor housing 5 includes an armature shaft 8 which is journaled by a ball bearing 8a mounted in a partition wall 3a at the rear of the gear housing 3. The armature shaft 8 of the motor 7 projects into the body housing 2 so as to mesh with a gear 10 integrally formed with a gear shaft 9 which is supported in the body housing 2 and is oriented perpendicularly to the armature shaft 8. An eccentric crank pin 11 is fixed in the upper surface of the gear 10 at a position displaced from the axis of the gear shaft 9.

In the body housing 2, a slider 12 is supported by a pair of bearings 13 secured to the gear housing cover 4 so as to extend parallel to the armature shaft 8 and to project forwardly from the front of the body housing 2. A suitable tool bit, such as a blade 14, is attached to the front end of the slider 12 so as to work on a workpiece. A grooved slider block 15 having an inverted U-shaped cross section is mounted in the underside of, and at right angles to, the slider 12 between the two bearings 13. The top end of the crank pin 11 is slidably fitted in the groove of the slider block 15 by means of a needle bearing 16. Rotation of the gear 10 imparts circular motion to the crank pin 11, which causes the slider block 15 to move with a strictly backward and forward motion, thus imparting reciprocating motion to the slider 12.

Figure 2A:
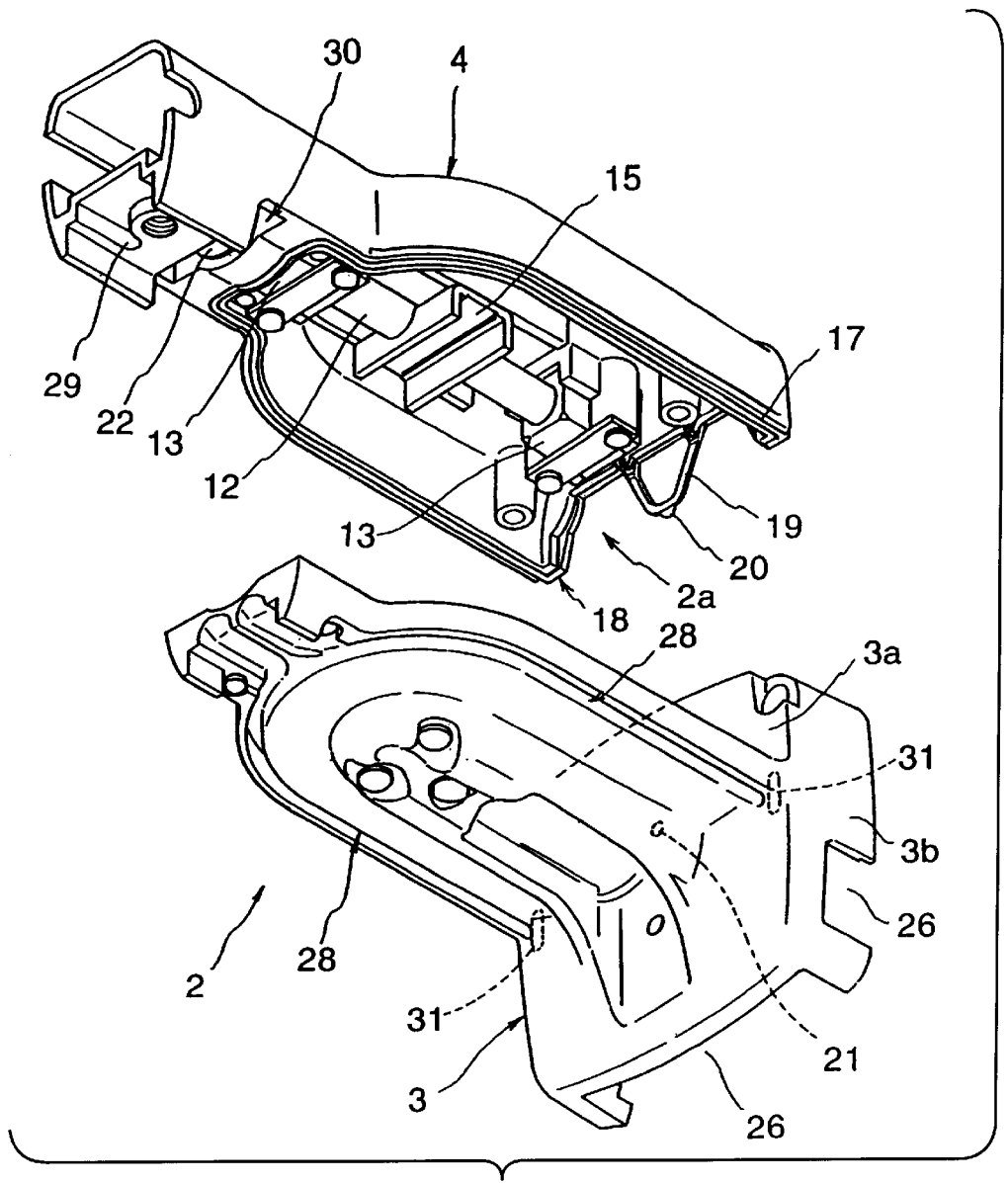
FIGS. 2A and 2B are perspective view of the body housing of the reciprocating saw shown in FIG. 1 with the gear housing cover detached from the gear housing.
Figure 2B:
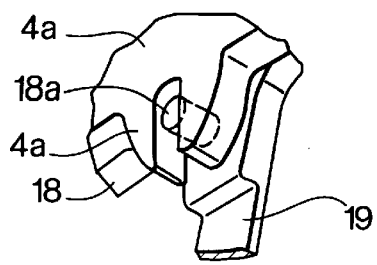
Figure 3:
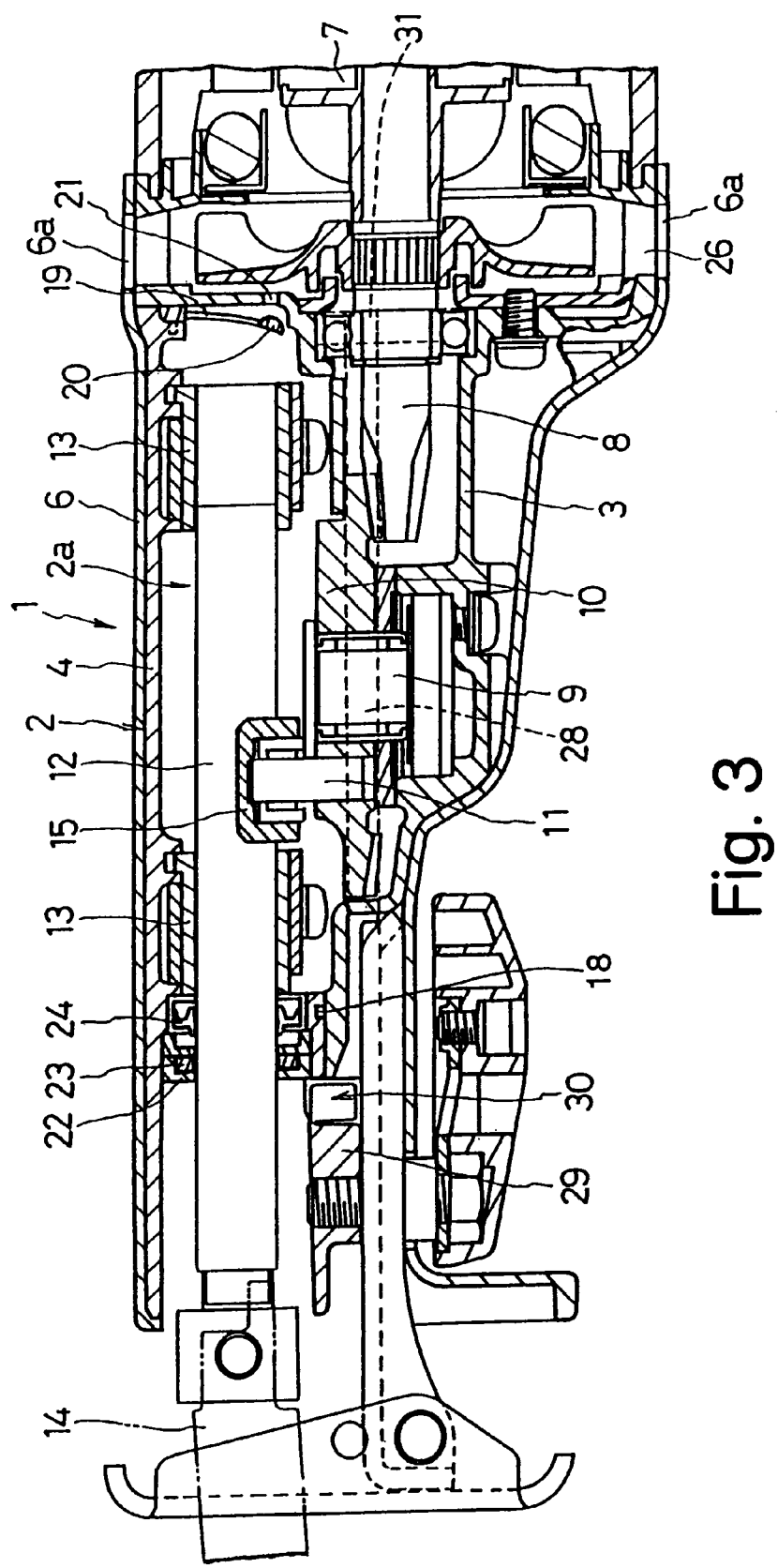
FIG. 3 is a lengthwise cross section of an essential part of the reciprocating saw shown in FIG. 1 with the slider in a forward (advance) position.

Referring to FIGS. 2A and 2B, the body housing 2 is depicted in perspective with the gear housing cover 4 detached from the gear housing 3. A groove 17 is formed along the entire portion of the edge of the gear housing cover 4 that comes into contact with the gear housing 3 when these two components are assembled together to form the body housing 2. Upon such assembly, a chamber 2a is defined by the gear housing 3 and the gear housing cover 4 within the body housing 2. Additionally, a rubber packing 18 is fitted in the groove 17 along the entire length thereof, routed along the part of the seam between the partition wall 3a of the gear housing 3 and the rear edge of the gear housing cover 4. When the body housing 2 is assembled, the entire length of the rubber packing 18 comes into contact with the partition wall 3a and the gear housing 3, thus sealing the entire seam between the gear housing cover 4 and the gear housing 3. Moreover, a generally V-shaped valve 19 is formed downwardly from the part of the rubber packing 18 that comes into contact with the partition wall 3a. The V-shaped valve 19 includes a protrusion 20 at the bottom bend. An air vent 21 is formed through the partition wall 3a in order to place the front of the partition wall 3a (the inside of the chamber 2a) in communication with the rear (the outside of the chamber 2a). The air vent 21 is located so that the protrusion 20 of the valve 19 abuts and covers the air vent while the reciprocating saw 1 is switched off (or when the slider 12 is in the position shown in FIG. 1). As shown in FIG. 2B, a pair of positioning posts 18a protrudes forwardly from where the valve 19 is joined to the packing 18. The valve 19 can be accurately positioned by placing the positioning posts 18a in a pair of post holders 4a formed on the rear edge of the gear housing cover 4.

To lubricate the slider 12, a seal retainer 22 fitted with a felt ring 23 is secured to the gear housing cover 4 in front of the front slider bearing 13. In addition, a dust seal 24 is mounted on the gear housing cover 4 between the seal retainer 22 and the front slider bearing 13 so as to seal the chamber 2a where the slider 12 penetrates the chamber 2a. In this way, the chamber 2a is tightly sealed by the dust seal 24 and the packing 18.

The gear housing 3 also includes a flange 3b which extends rearward from the partition wall 3a and is joined to the motor housing 5. A fan 25 mounted on the armature shaft 8 is located within the flange 3b. A plurality of air outlets 26 are formed in the flange 3b, whereas complementary air outlets 6a are also formed in the insulating cover 6. These air outlets 26 and 6a place the inside of the flange 3b in communication with the atmosphere, such that when the fan 25 is operated by the rotation of the armature shaft 8, air is drawn into the tool from the rear of the motor housing 5 and exits the reciprocating saw 1 at the air outlets 26 and 6a after cooling the motor 7. It should be noted that the air vent 21 is located in the area of the partition wall 3a opposing the fan 25 and that a recess 27 so dimensioned as to snugly accommodate the front portion of the fan 25 is formed in the rear surface of the partition wall 3a so that the peripheral edges of the fan blades are located in close proximity to the peripheral wall of the recess 27. These features prevent entry of dust, water, and other foreign matter into the body housing 2 through the air vent 21.

As best shown in FIG. 2A and 2B, a pair of grooves 28 is symmetrically formed along the length of the side edges of the gear housing 3. The grooves 28 terminate at the front end of the gear housing 3, where they are connected to an opening 30 formed between the gear housing 3 and a cylindrical portion 29 at the front end of the gear housing cover 4. At the rear end of the gear housing 3, the grooves 28 are connected to through-holes 31 formed in the partition wall 3a. When the insulating cover 6 is set in place, each groove 28 provides an air passage extending along the side edge of the gear housing 3 from the inside of the motor housing 5 to the cylindrical portion 29. As air is delivered through these passages by rotation of the fan 25, the gear housing 3 is cooled before the air exits at the front end of the housing 3.

In the operation of the reciprocating saw 1, when the motor 7 is driven to activate the armature shaft 8 and the gear 10, the crank pin 11 is set in circular motions. This in turn causes the slider block 15, and thus the slider 12, to reciprocate, also setting the blade 14 attached to the top end of the slider 12 in reciprocating motion. As shown in FIG. 3, when the slider 12 moves to a forward (advance) position, the pressure inside the sealed chamber 2a becomes lower than that outside the chamber. This moves the valve 19 forward so as to detach the protrusion 20 from the air vent 21, thereby allowing air to enter the sealed chamber 2a via the air vent 21. When the slider 12 moves rearward or is retracted, the air pressure inside the sealed chamber 2a increases to cause the resilient valve 19 to return to its position shown in FIG. 1, where it abuts the air vent 21. As the valve 19 is pressed with increasing force against the partition wall 3a by the rising air pressure, the protrusion 20 closes the air vent 21. Since the volume of air displaced by the retracting slider 12 can no longer exit the sealed chamber 2a through the air vent 21, it is discharged forward between the slider 12 and the dust seal 24, thereby preventing entry of foreign matter into the sealed chamber at this location.

Meanwhile, air enters the through-holes 31 and travels along the grooves 28 while cooling the gear housing 3. The air then flows through the opening 30 and eventually into the cylindrical portion 29 of the gear housing cover 4. As this airflow blows any dust off the cylindrical portion 29 in the forward direction, it minimizes the entry of dust into the sealed chamber 2a through the dust seal 24.

As should be clear from the foregoing description, the embodiment effectively prevents entry of dust, water, and other foreign matter into the sealed chamber 2a by opening and closing of the valve 19 in response to the reciprocating motion of the slider 12. In particular, the valve prevents reduction in the air pressure inside the sealed chamber 2a and thus suction of foreign matter into the sealed chamber during the retraction of the slider 12 into the sealed chamber, when dust would otherwise easily enter the sealed chamber with the slider 12. Instead, the closing of the valve 19 causes air to exit the chamber through the dust seal 24, thus protecting the inside of the sealed chamber 2a from foreign matter. In addition, the valve 19 is integrally formed with the packing 18 and automatically opens and closes the air vent 21 in response to the reciprocation of the slider 12. This realizes a simple sealing structure that comprises a small number of components. Moreover, the airflow from the fan 25 to the cylindrical portion 29 through the grooves 28 greatly reduces the amount of dust reaching the dust seal, further enhancing the sealing of the chamber 2a. Since hardly any foreign matter reaches the inside of the sealed chamber 2a, the gearing and bearings of the reciprocating saw 1 remain intact over an extended period, enhancing the durability of the tool.

In the foregoing embodiment, the packing 18 is integrally formed with the valve 19. It will be appreciated by those with ordinary skill in the art that these two components can be separately provided depending on the design of the body housing 2 or the location of the fan 25. As in this embodiment, the air vent 21 should preferably be located in the area of the partition wall 3a opposing the fan 25 to most effectively prevent the entry of foreign matter into the sealed chamber 2a through the air vent 21. However, if there is little or no possibility of entry of foreign matter through the air vent 21, the air vent may be located outside of this area. It should be also noted that a plurality of air vents may be provided together with matching valves.

In the above-described embodiment, sealing of the chamber 2a is achieved by the pressure control inside the sealed chamber by the valve and by the airflow to the front portion of the slider 12. The latter feature can be omitted depending on the application and the type of the tool without sacrificing the sealing of the chamber 2a.

It will thus be seen that the present invention efficiently attains the objects set forth above, among those made apparent from the preceding description. As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

What is claimed is:

1. A sealing structure for use in an electric power tool, comprising
   a sealed chamber containing a portion of a reciprocable slide member having a front end which penetrates the chamber and a rear end disposed within the chamber, the sealed chamber, including the area penetrated by the slide member, being sealed off from the outside, the sealed chamber being located downwind of a fan for cooling a motor provided in the electric power tool, the sealed chamber including a partition wall in close proximity to the fan,
   an air vent formed in the sealed chamber for placing the sealed chamber in communication with the atmosphere, the air vent being formed in the area of the partition wall opposing the fan, and
   a valve provided in the sealed chamber communicating between the interior of the sealed chamber and the atmosphere and movable between a first position and a second position, wherein when in the first position, the valve opens the air vent due to an advance of the slide member and when in the second position, the valve closes the air vent due to retraction of the slide member.

2. A sealing structure in accordance with claim 1, wherein the sealed chamber is defined by a pair of casing halves fitted together to form a seam and further comprising an endless seam packing fitted along the entire length of the seam between the casing halves.

3. A sealing structure in accordance with claim 2, wherein the valve is made of a resilient material formed integrally with the packing and is adapted to move between the first and the second positions in response to the change in the air pressure inside the sealed chamber caused by the reciprocating motion of the slide member.

4. A sealing structure in accordance with claim 1, wherein the valve is formed in an approximate V-shape having a bottom portion, the valve including a protrusion at the bottom portion for abutting and closing the air vent due to the retraction of the slide member and for moving forward to open the air vent due to the advance of the slide member.

5. A sealing structure in accordance with claim 4, further comprising means for positioning the protrusion of the valve with respect to the air vent.

6. A sealing structure in accordance with claim 1, further comprising at least one air passage for bringing a portion of the airflow generated by the fan into the proximity of the area of the sealed chamber penetrated by the slide member via the exterior of the sealed chamber so as to discharge the portion of the airflow substantially parallel to the direction of the advance of the slide member.

7. A sealing structure in accordance with claim 6, wherein the sealed chamber includes a casing upper half and a casing lower half which includes the partition wall, and further wherein two of the air passages are symmetrically grooved along the exterior of the casing lower half, each connected at a rear end to a through-hole formed in the partition wall of the sealed chamber.

8. A sealing structure in accordance with claim 1, wherein the electric power tool is a reciprocating saw in which a blade is attached to the front end of the slide member.

9. A reciprocating saw comprising
- a chamber capable of being sealed off from the outside thereof, the chamber including a wall at a rear end thereof,
- a slide member which is disposed in the sealed chamber and has a front end penetrating the sealed chamber to the outside thereof, the slide member being adapted to reciprocate in lengthwise directions between an advance position and a retracted position,
- valve means mounted in the wall of the chamber for placing the inside of the chamber in communication with the outside thereof due to the advance of the slide member and for sealing the chamber due to the retraction of the slide member, and
- a fan provided outside the chamber and directly rearward of and in close proximity to the valve means for delivering air into the chamber through the valve means due to the advance of the slide member.

10. A reciprocating saw in accordance with claim 9, further comprising seal means mounted in the chamber proximal to where the chamber is penetrated by the slide member and sealing the chamber where the chamber is penetrated by the slide member, the seal means being adapted to allow an amount of air substantially corresponding to the volume displaced by the retraction of the slide member within the chamber to be discharged forward out of the chamber at the seal means.

11. A reciprocating saw in accordance with claim 9 further comprising an air vent formed in an area of the wall opposing the fan, and
- wherein the valve means is adapted for closing the air vent due to the retraction of the slide member and for opening the air vent due to the advance of the slide member.

12. A sealing structure in accordance with claim 1
- wherein the sealed chamber is defined by a pair of casing halves fitted together to form a seam and further comprising a seam packing fitted along the length of the seam between the casing halves, and
- wherein the valve is suspended from the seam packing in close proximity to the partition wall inside the sealed chamber.

* * * * *